M. W. HICKEY.
VEHICLE TIRE.
APPLICATION FILED OCT. 7, 1911.
1,137,317. Patented Apr. 27, 1915.
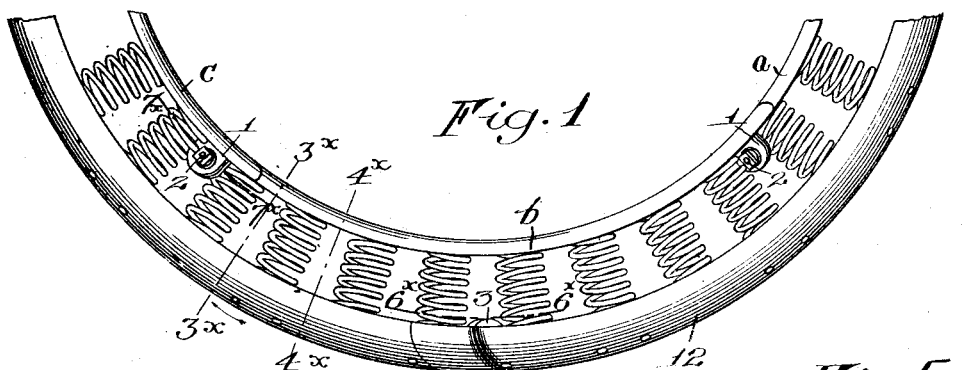
Fig. 1
Fig. 2
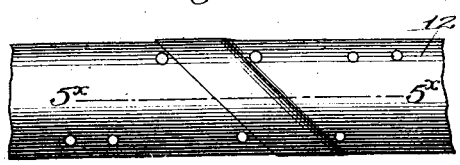
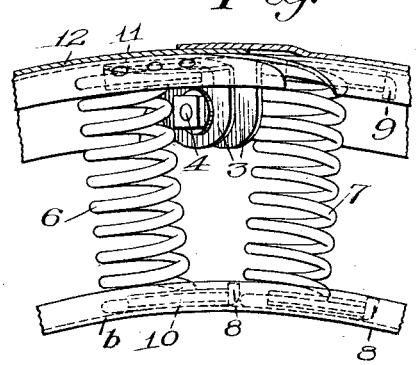
Fig. 5
Fig. 3    Fig. 4    Fig. 6
  
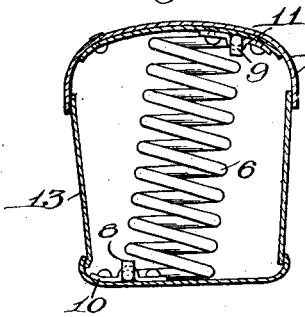 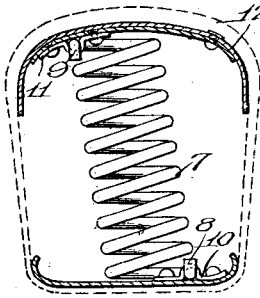 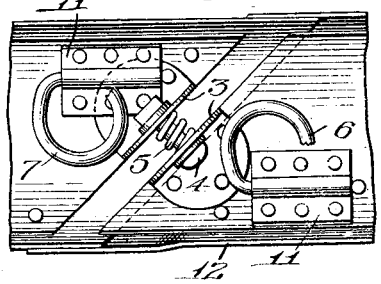
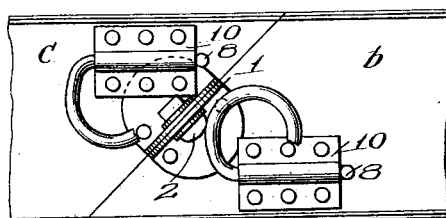
Fig. 7
Witnesses
Nelson H. Copp
Walter B. Payne
Inventor
Michael W. Hickey
By Church & Rich
his Attorneys

UNITED STATES PATENT OFFICE.

MICHEL W. HICKEY, OF ROCHESTER, NEW YORK.

VEHICLE-TIRE.

1,......... Specification of Letters Patent. Patented Apr. 27, 1915.

Application filed October 7, 1911. Serial No. 653,353.

*To all whom it may concern:*

Be it known that I, MICHEL W. HICKEY, of Rochester, in the county of Monroe and State of New York, have invented certain new and useful Improvements in Vehicle-Tires; and I do hereby declare the following to be a full, clear, and exact description of the same, reference being had to the accompanying drawings, forming a part of the specification, and to the reference numerals marked thereon.

My present invention relates to vehicle tires, and has for its object to provide one in which an elastic or resilient action is obtained by the use of a plurality of springs in lieu of the well known form of pneumatic tubes.

More specifically, a tire embodying my invention may be described as comprising inner and outer rings between which springs are located, said rings being divided into sections, those of the outer ring are joined in such a way that they may yield in contact with the ground under the rolling action of the wheel.

A further object of my invention is to provide a tire with an exterior metallic shoe made of overlapping sections which may be easily removed and replaced.

To these and other ends the invention consists in certain improvements and combinations of parts, as will be hereinafter more fully described, the novel features being pointed out in the claims at the end of the specification.

In the drawings: Figure 1 is a view showing in side elevation a portion of a tire constructed in accordance with my invention; Fig. 2 is a view showing in elevation the tread or face of the tire; Figs. 3 and 4 are cross-sectional views, taken respectively on the lines 3×—3× and 4×—4× of Fig. 1; Fig. 5 is an enlarged sectional view taken on the line 5×—5× of Fig. 2; Fig. 6 is an enlarged view taken on the line 6×—6× of Fig. 1, showing the connection between adjacent ends of the outer ring of the tire, and Fig. 7 is a view taken on the line 7×—7× of Fig. 1, showing the connection between the adjacent ends of two sections of the inner ring of the tire.

Similar reference numerals in the several figures indicate similar parts.

In carrying out my invention I provide the inner or base ring adapted to fit the rim or felly of a wheel of any given diameter, which is composed of a plurality of sections indicated in Fig. 1 by *a*, *b* and *c*. The ends of these sections of the ring are cut diagonally, as shown in Fig. 7, and each is provided with a perforated ear 1 adapted to receive a bolt 2, by means of which they may be rigidly connected either before placing the tire upon a wheel or, if desired, the bolts may be drawn up after the tire has been placed upon the wheel and thus employed to clamp the tire on the wheel.

The outer ring of the tire is similarly constructed of a plurality of sectional pieces, the ends of which are also formed on diagonal lines, as shown in Fig. 6. The ends of the adjacent sections of the outer ring are not rigidly connected, but are capable of movement relatively to each other. For this reason a short space is left between the ends of the adjacent sections, as shown in Fig. 6, and each section is provided with an ear 3 through which passes the bolt 4 surrounded by the spring 5, which serves to separate the ends of the sections and maintain them in this position, but permits each section, when a weight is applied thereto by the rotary movement of the wheel, to move slightly with reference to the adjacent sections and thus obviate the displacement of the outer ring as a whole throughout its entire circumference.

The inner ring is connected with the outer ring, and the latter is supported on the former by means of a plurality of coil springs equidistantly spaced and extending in radial planes. The alternate springs are inclined at a slight angle, those indicated by 6 being inclined as shown in Fig. 3, while those indicated by 7 are inclined as shown in Fig. 4. Each spring extends from one side of the inner ring to the opposite side of the outer ring, but being inclined alternately in opposite directions they support the outer ring in such a way as to be capable of withstanding side thrusts and strains imparted to it, such as occur when vehicles are turning corners and encounter obstacles in the roadbed with one side of their tread surface instead of the full face of the tire. In addition to the particular arrangement of the springs described, these are alternately made with right and left hand coils as a means of providing a uniform balance to both sides of the face of the tire.

The opposite ends of each spring terminate in attaching arms or portions 8 and 9 at opposite sides of the coil, and are made straight and adapted to be pivoted in the clips 10 and 11, the former being attached to the inner ring near one of its edges, while the other clip 11 is attached to the outer ring and near the opposite edge thereof. This arrangement of the parts, it will be seen, not only gives the points of attachment of the springs to the rings the widest possible separation laterally with only a slight inclination of the spring out of a true horizontal position, but also permits the end coils of the springs when compressed to engage the respective inner and outer rings to form a broad bearing surface for acting under heavy loads.

The outer ring is provided with a shoe, or cover, 12, made in sections and corresponding to the sections of the ring proper, the edges of which overlap as shown in Fig. 6, to cover the apertures between said ring sections and to provide yielding or expansible joints. The lateral edges of the outer covering or shoe are preferably extended, as shown in Figs. 3 and 4, toward the inner ring, and the edges of the latter are similarly curled outwardly, and if desired, these edges may be connected by strips of flexible material, as indicated by 13 in Fig. 3, or the complete tire may be inclosed in a casing as indicated in dotted lines in Fig. 4.

A tire constructed in accordance with my invention may be made in any diameter desired and by the selection of coil springs of proper strength the tires may be conveniently adapted to vehicles intended to be used for various purposes.

I claim as my invention:

1. A vehicle tire composed of an inner ring, an outer surrounding ring spaced therefrom composed of sections spaced apart at their adjacent ends and expansible coil springs supporting the outer ring sections upon the inner ring, of inwardly turned ears on said sections, a fastening member extending loosely through said ears and connecting the ends of said sections, a shoe also composed of sections surrounding the outer ring and covering the space between the ends of the sections of said outer ring.

2. A tire composed of two concentric rings spaced apart, expansible coil springs extending outwardly from the inner ring and supporting the outer ring, said springs being inclined alternately in opposite directions relatively to the plane of the tire, and each extending from one side of the inner ring to the opposite side of the outer ring, the alternate springs being formed by having their coils wound in opposite directions.

MICHEL W. HICKEY.

Witnesses:
G. WILLARD RICH,
RUSSELL B. GRIFFITH.